United States Patent
Yang et al.

(10) Patent No.: US 10,846,559 B2
(45) Date of Patent: Nov. 24, 2020

(54) IMAGE DETECTION METHOD, SYSTEM AND NON-VOLATILE COMPUTER READABLE MEDIUM

(71) Applicant: BOE TECHNOLOGY GROUP CO., LTD., Beijing (CN)

(72) Inventors: Jinglin Yang, Beijing (CN); Xiaojun Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 315 days.

(21) Appl. No.: 15/941,941

(22) Filed: Mar. 30, 2018

(65) Prior Publication Data
US 2019/0065891 A1    Feb. 28, 2019

(30) Foreign Application Priority Data
Aug. 28, 2017    (CN) .......................... 2017 1 0751699

(51) Int. Cl.
| | |
|---|---|
| *G06K 9/62* | (2006.01) |
| *G06T 7/143* | (2017.01) |
| *G06T 7/73* | (2017.01) |
| *G06K 9/32* | (2006.01) |

(52) U.S. Cl.
CPC ......... *G06K 9/6202* (2013.01); *G06K 9/3216* (2013.01); *G06T 7/143* (2017.01); *G06T 7/75* (2017.01); *G06K 2209/21* (2013.01)

(58) Field of Classification Search
CPC ................................. G06T 7/75; G06T 7/143
See application file for complete search history.

(56) References Cited

U.S. PATENT DOCUMENTS

| | | | | |
|---|---|---|---|---|
| 2014/0307621 | A1* | 10/2014 | Frenger | H04W 56/0025 370/328 |
| 2016/0242229 | A1* | 8/2016 | Balachandran | H04W 4/70 |
| 2016/0338005 | A1* | 11/2016 | Lim | H04W 8/22 |
| 2017/0055250 | A1* | 2/2017 | Lim | H04W 74/006 |

(Continued)

OTHER PUBLICATIONS

"First Office Action," Chinese Application No. 201710751699.9 dated Dec. 3, 2019.

(Continued)

*Primary Examiner* — Bobbak Safaipour
(74) *Attorney, Agent, or Firm* — Womble Bond Dickinson (US) LLP (57) ABSTRACT

Embodiments of the present disclosure disclose an image detection method including: establishing a data model based on mark point information of a group of first strip-like line segments, the mark point information of each first strip-like line segment including the length, the width, the direction and the coordinate of the center point of the first strip-like line segment, establishing a priori model based on the distribution and the number of a group of second strip-like line segments which constitute a target structure, establishing a probability density function for the data model and the priori model, and performing sampling and solution optimization to obtain a globally optimal solution, and detecting the image taking the globally optimal solution as a target model. The embodiments of the present disclosure also disclose an image detection system and a non-volatile computer readable medium.

17 Claims, 9 Drawing Sheets

(56) References Cited

U.S. PATENT DOCUMENTS

2017/0135005 A1* 5/2017 Basu Mallick ..... H04L 63/0853

OTHER PUBLICATIONS

He, J., et al., "Road network extraction from remote sensing image based on modified marked point process," 2013, 49(17)150-153; 4 pages (1 page of English translation of Abstract only).
Linlin, L., "The Application of Marked Point Process in Road Extraction," 2008; 93 pages (2 pages of English translation of Abstract only).
Stoica et al., "A Gibbs Point Process for Road Extraction from Remotely Sensed Images", International Journal of Computer Vision, vol. 57, No. 2, 2004, pp. 121-136.
Lacoste et al., "Point Processes for Unsupervised Line Network Extraction in Remote Sensing", IEEE Transactions on Pattern Analysis and Machine Intelligence, vol. 27, No. 10, Oct. 2005, pp. 1568-1579.

* cited by examiner

IMAGE DETECTION METHOD, SYSTEM AND NON-VOLATILE COMPUTER READABLE MEDIUM

RELATED APPLICATIONS

This application claims the benefit to Chinese patent application No. 201710751699.9 filed on Aug. 28, 2017, the entire disclosure of which is incorporated herein by reference.

TECHNICAL FIELD

The present disclosure relates to an image detection method, system and non-volatile computer readable medium.

BACKGROUND

An image is detected by establishing a target model when detecting whether there is a known target structure in the image. The target model or the target structure is generally constituted by lines, and each of the lines has length information and direction information. When the resolution of the image is low, the width of the individual line segments which constitute the target structure may be ignored, and therefore, this approach is effective in image detection. However, as the resolution of the image is higher and higher, the target template constructed by the above approach has gradually failed to accurately characterize the features of the target structure.

SUMMARY

An embodiment of the present disclosure provides an image detection method including: establishing a data model based on mark point information of a group of first strip-like line segments, the mark point information of each first strip-like line segment including the length, the width, the direction and the coordinate of the center point of the first strip-like line segment, establishing a priori model based on the distribution and the number of a group of second strip-like line segments which constitute a target structure, establishing a probability density function for the data model and the priori model, and performing sampling and solution optimization to obtain a globally optimal solution, and detecting the image taking the globally optimal solution as a target model.

Optionally, the step of establishing the data model includes: dividing each first strip-like line segment into multiple sub-strip-like line segments, and calculating the homogeneity within the first strip-like line segment according to the position relationship between every two sub-strip-like line segments, calculating the heterogeneity between each first strip-like line segment and each of its neighboring first strip-like line segments according to the position relationship between the first strip-like line segment and each of its neighboring first strip-like line segments, and determining a first statistic of each first strip-like line segment based on the homogeneity and the heterogeneity.

Optionally, the step of establishing the data model includes: determining a second statistic of each first strip-like line segment based on gradient magnitude of the boundary of each first strip-like line segment, and determining a third statistic of each first strip-like line segment based on gradient direction of the boundary of each first strip-like line segment.

Optionally, the step of establishing the priori model includes: for any second strip-like line segment and another second strip-like line segment within a selected adjacent region of the second strip-like line segment, determining a first direction relationship based on the directions of the two second strip-like line segments.

Optionally, the step of establishing the priori model includes: for each second strip-like line segment and another second strip-like line segment outside a selected adjacent region of the second strip-like line segment, determining the degree of connection between the two second strip-like line segments based on the connection judgment region area of the near ends of the two second strip-like line segments, and determining a second direction relationship based on the directions of the two second strip-like line segments.

Optionally, the step of performing sampling includes: selecting a transfer kernel, and generating a new state space based on a current state space according to the selected transfer kernel, and determining whether to jump to the new state space according to the energy functions of the current state space and the new state space and the probability of jumping between the current state space and the new state space.

Optionally, the transfer kernel includes multiple different sub-kernels, which sub-kernels include at least one of uniform birth and death kernels and simple moving kernels.

An embodiment of the present disclosure provides an image detection system including one or more processor configured to execute computer instructions to perform one or more step of the following method: establishing a data model based on mark point information of a group of first strip-like line segments, the mark point information of each first strip-like line segment including the length, the width, the direction and the coordinate of the center point of the first strip-like line segment, establishing a priori model based on the distribution and the number of a group of second strip-like line segments which constitute a target structure, establishing a probability density function for the data model and the priori model, and performing sampling and solution optimization to obtain a globally optimal solution, and detecting the image taking the globally optimal solution as a target model.

An embodiment of the present disclosure provides a non-volatile computer readable medium configured to store a computer program product containing instructions which, when executed in a processor, implement one or more step of the following method: causing to establish a data model based on mark point information of a group of first strip-like line segments, the mark point information of each first strip-like line segment including the length, the width, the direction and the coordinate of the center point of the first strip-like line segment, causing to establish a priori model based on the distribution and the number of a group of second strip-like line segments which constitute a target structure, causing to establish a probability density function for the data model and the priori model, and perform sampling and solution optimization to obtain a globally optimal solution, and causing to detect the image taking the globally optimal solution as a target model.

DETAILED DESCRIPTION OF THE INVENTION

In the following various embodiments of the present disclosure will be described in detail with reference to the drawings.

Figure 1A:
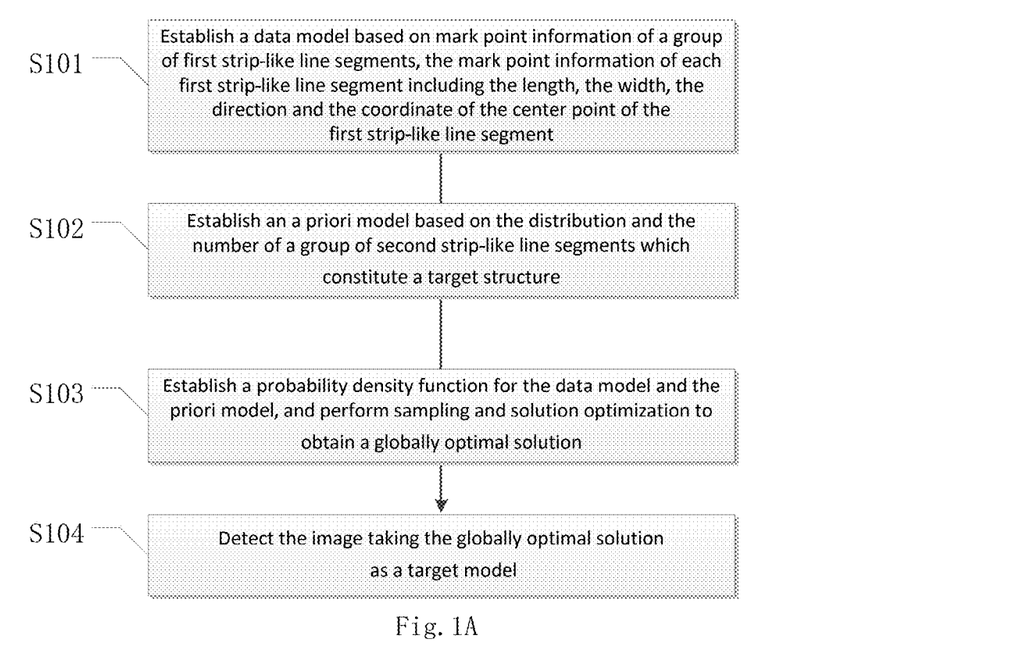
FIGS. 1A-1D are multiple schematic flow charts of embodiments of an image detection method of the present disclosure.
Figure 2:
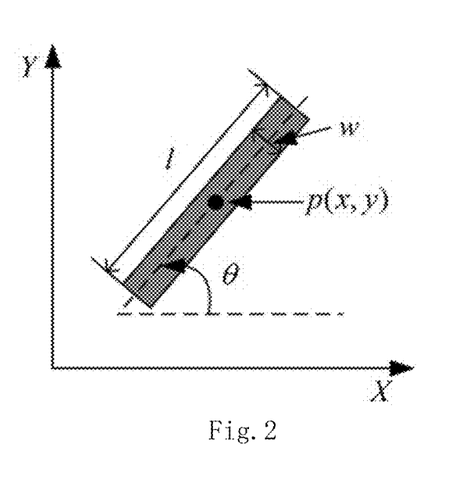
FIG. 2 is a schematic diagram of mark point information of a strip-like line segment in an embodiment of the image detection method of the present disclosure.

FIG. 1 is a schematic flow chart of an embodiment of an image detection method of the present disclosure, and FIG. 2 is a schematic diagram of mark point information of a strip-like line segment in an embodiment of the image detection method of the present disclosure.

As shown in FIG. 1, an image detection method of an embodiment of the present disclosure includes the following steps.

At S101, a data model is established based on mark point information of a group of first strip-like line segments, the mark point information of each first strip-like line segment including the length, the width, the direction and the coordinate of the center point of the first strip-like line segment.

For example, the data model is constituted by a group of strip-like line segments. In the data model, there are various spatial topological relationships between these strip-like line segments. It may be possible to set a group of first strip-like line segments many times, thereby gradually approaching a target model. Under the algorithm framework of the mark point process, each first strip-like line segment in each group of first strip-like line segments may be considered as a mark point. With reference to FIG. 2, each first strip-like line segment may be denoted as:

$$s=(p,l,w,\theta) \qquad \text{Eq. 1}$$

In Eq. 1, $p=(x, y) \in \Lambda \subset R^2$ represents the coordinate of the center point of the first strip-like line segment, $\Lambda$ represents an image space, $R^2$ represents two dimensions, $l$ represents the length of the first strip-like line segment, $w$ represents the width of the first strip-like line segment, and $\theta$ represents the direction of the first strip-like line segment, and its value is within the interval of $[0, \pi]$.

In each group of first strip-like line segments, based on the mark point information of the individual first strip-like line segments, a data model may be established to represent respective features of the individual first strip-like line segments in the group of first strip-like line segments and the distribution relationship between them.

At S102, a priori model is established based on the distribution and the number of a group of second strip-like line segments which constitute a target structure.

For example, the priori model is established according to the features of the target structure. The target structure is considered to be constituted by a group of second strip-like line segments, and there are also various spatial topological relationships between these second strip-like line segments. The individual second strip-like line segments are considered as mark points, and may also be represented by the above Eq. 1. The priori model represents the number of the second strip-like line segments in the group of second strip-like line segments and the distribution relationship between the individual second strip-like line segments.

At S103, a probability density function is established for the data model and the priori model, and sampling and solution optimization is performed to obtain a globally optimal solution.

For example, the data model is denoted as $U_d(S)$, the priori model is denoted as $U_p(S)$, wherein S is a combination of a group of strip-like line segments. Then, the Gibbs point process is employed for modeling. The probability density function established for the data model and the priori model is as follows:

$$f(S) \propto \beta^n \exp(-U(S)) = \beta^n \exp(-((U_p(S)+U_d(S)))) \qquad \text{Eq. 2}$$

For example, the sampling may be performed by the Reversible Jump Markov Chain Monte Carlo (RJMCMC) method, jump is conducted between a current state space and a new state space, and the solution optimization is performed by the simulated annealing algorithm to obtain a globally optimal solution.

At S104, the image is detected taking the globally optimal solution as a target model.

When the globally optimal solution is calculated, the calculated optimal solution is taken as the target model, which may be used for automatically detecting the target structure represented by the target model from the image to be detected.

By the image detection method and system of the embodiments of the present disclosure, width information is added to individual line segments of the target model and they become strip-like line segments, which causes that the built target model accurately characterize the features of the target structure, and improves the accuracy of image detection.

In some embodiments, the data model $U_d(S)$ may be represented as $$U_d(S) \propto \exp\left(-\gamma_d \sum_{s_i \in S} \delta_i\right) \qquad \text{Eq. 3}$$

wherein $\delta_i$ represents a statistic of any strip-like line segment $s_i$ constituting S, $S=\{s_1, s_2, \ldots s_n\}$ represents the target structure, and $\gamma_d$ represents a weight, which is a positive constant. For a given set S of strip-like line segments, any strip-like segment $s_i$ therein is relatively independent of its neighboring strip-like line segment.

Figure 3:
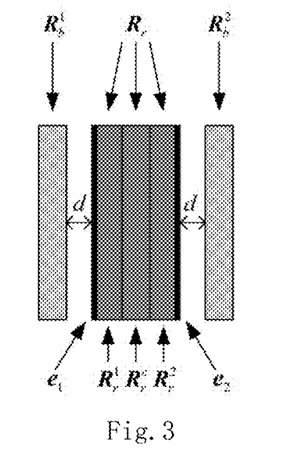
FIG. 3 is a characterization schematic diagram of a statistic of the data model in an embodiment of the image detection method of the present disclosure.

FIG. 3 is a characterization schematic diagram of a statistic of the data model in an embodiment of the image detection method of the present disclosure.

In some embodiments, the establishing a data model includes creating a first statistic characterizing the internal homogeneity and the external heterogeneity of a first strip-like line segment within a group.

As shown in FIG. 3, Rr represents a region of any first strip-like line segment, and in this region there are divided three sub-strip-like line segments, a center strip-like line segment $R_r^c$ and strip-like line segments $R_r^1$, $R_r^2$ on both sides, respectively. $R_b^1$ and $R_b^2$ located on both sides of Rr represent neighborhoods outside Rr, and d represents the distance between Rr and the neighborhoods. e1 and e2 represent two edges of the first strip-like line segment Rr. Therein, although, in the embodiment as shown in FIG. 3, the internal region of Rr is divided into three sub-strip-like line segments, the present disclosure is not limited thereto, and the internal region of Rr may also be divided into other number of sub-strip-like line segments, e.g., two, four, five, etc.

In FIG. 3, there is homogeneity in the interior of the region of $R_r$, whereas for the neighborhoods outside $R_r$, the characteristics of gray scale or texture that are shown are different from those of the interior of the region of $R_r$, and there is heterogeneity therein.

Figure 1B:
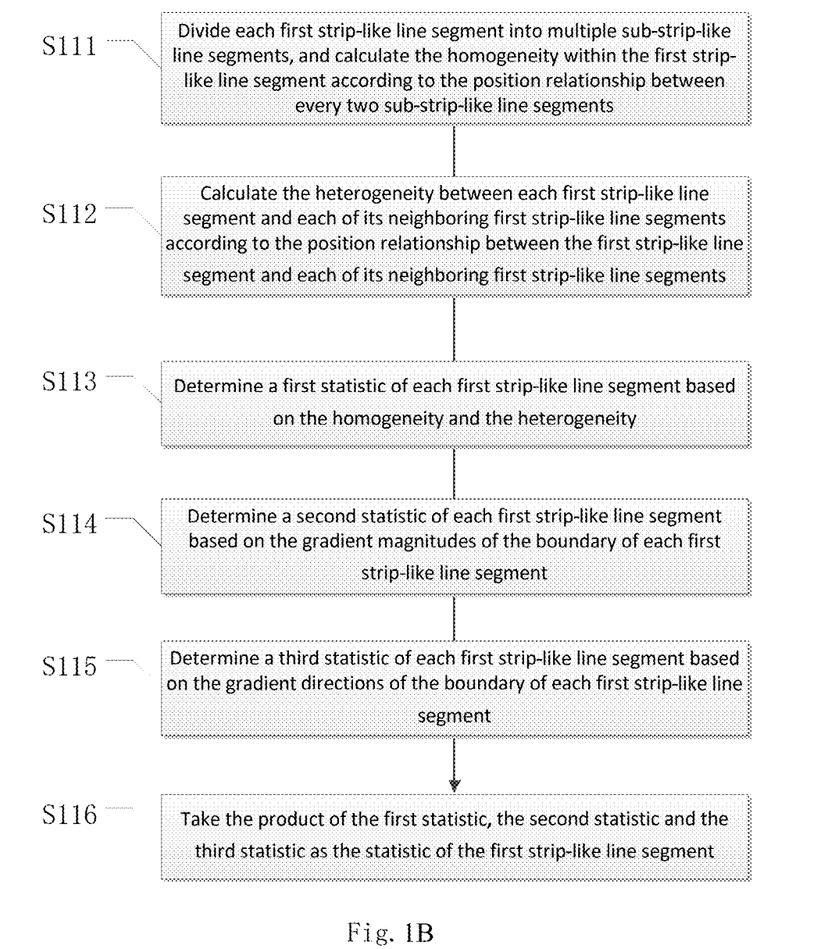

With reference to FIG. 1B, in some embodiments, at the step S111, each first strip-like line segment is divided into multiple sub-strip-like line segments, and the homogeneity within the first strip-like line segment is calculated according to the position relationship between every two sub-strip-like line segments. In some embodiments, at the step S112, the heterogeneity between each first strip-like line segment and each of its neighboring first strip-like line segments is further calculated according to the position relationship between the first strip-like line segment and each of its neighboring first strip-like line segments. In some embodiments, at the step S113, a first statistic of each first strip-like line segment is determined based on the calculated homogeneity and heterogeneity.

An embodiment of the present disclosure may employ, for example, the Bhattacharyya distance, etc. to calculate the homogeneity of the internal region of each first strip-like line segment and the heterogeneity between each first strip-like line segment and each of its neighboring first strip-like line segments.

In statistics, the Bhattacharyya distance is used for measuring the separability of two discrete probability distributions, and its value is 1 when they completely match, and is 0 when they do not match at all. The calculation formula of the Bhattacharyya distance is as follows:

$$d(s_i, s_j) = \frac{1}{8}(m_i - m_j)^T \left(\frac{\sigma_i^2 + \sigma_j^2}{2}\right)^{-1}(m_i - m_j) + \frac{1}{2}\ln\left(\frac{\sigma_i^2 + \sigma_j^2}{2\sigma_i\sigma_j}\right) \quad \text{Eq. 4}$$

In the equation, $s_i$ and $s_j$ represent two discrete probability distributions respectively, and in particular, in an embodiment of the present disclosure, represent a sub-strip-like line segment inside a first strip-like line segment and a strip-like line segment of an external neighborhood respectively, $m_i$ and $m_j$ represent corresponding mean values respectively, and $\sigma_i$ and $\sigma_j$ represent corresponding standard deviations respectively.

For any first strip-like line segment $s_i$, the homogeneity $D_1$ between sub-strip-like line segments in its internal region may be calculated according to the following equation:

$$D_{i,1} = \max(d(R_r^c, R_r^1), d(R_r^c, R_r^2), d(R_r^1, R_r^2)) \quad \text{Eq. 5}$$

Then, the heterogeneity $D_2$ between any first strip-like line segment $R_r$ and the neighborhoods $R_b^1$ and $R_b^2$ is calculated according to the following equation:

$$D_{i,2} = \min(d(R_r, R_b^1), d(R_r, R_b^2)) \quad \text{Eq. 6}$$

And the synthetic characteristic Di of the homogeneity and the heterogeneity is calculated according to the following equation:

$$D_i = \frac{D_{i,2}}{\max[1, D_{i,1}]} \quad \text{Eq. 7}$$

Two thresholds $T_1$, $T_2$ are set for $D_i$, wherein $T_1 < T_2$, and the first statistic of the data model is created:

$$\delta_{i,1} = \begin{cases} 2 & D_i < T_1 \\ 1 - 2\dfrac{D_i - T_1}{T_2 - T_1} & T_1 < D_i < T_2 \\ -1 & D_i > T_2 \end{cases} \quad \text{Eq. 8}$$

Figure 4:
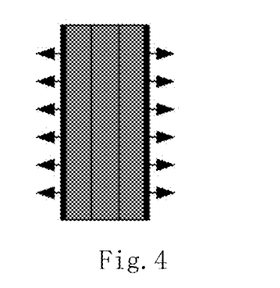
FIG. 4 is a characterization schematic diagram of another statistic of the data model in a further embodiment of the image detection method of the present disclosure.

FIG. 4 is a characterization schematic diagram of another statistic of the data model in a further embodiment of the image detection method of the present disclosure.

In some embodiments, the establishing a data model includes creating a statistic characterizing the boundary characteristics of a first strip-like line segment within a group, which includes, as shown in FIG. 1B, at the step S114, determining a second statistic of each first strip-like line segment based on the gradient magnitudes of the boundary of each first strip-like line segment, and at the step S115, determining a third statistic of each first strip-like line segment based on the gradient directions of the boundary of each first strip-like line segment.

As shown in FIG. 4, at a boundary of a strip-like line segment, an edge point generally has a large gradient, and since the boundary has a straight line shape, the distribution of gradient directions is relatively uniform, and they are approximately orthogonal to the direction of the target.

In some embodiments, for the gradient magnitude, statistics is performed on the mean values $m_{e_1}$, $m_{e_2}$ of the gradient magnitudes of the boundaries of each first strip-like line segment, thresholds $T_{G1}$ and $T_{G2}$ are set, and the overall mean value is first calculated according to the following equation:

$$m_G = \min(m_{e_1}, m_{e_2}) \quad \text{Eq.9}$$

Then, similar to the first statistic, the second statistic of the data model is created:

$$\delta_{i,2} = \begin{cases} 2 & m_G < T_{G1} \\ 1 - 2\dfrac{m_G - T_{G1}}{T_{G2} - T_{G1}} & T_{G1} < m_G < T_{G2} \\ -1 & m_G > T_{G2} \end{cases} \quad \text{Eq. 10}$$

For the gradient direction, statistics is performed on the gradient direction histograms $H(\theta_1)$ and $H(\theta_2)$, and for the gradient direction histograms of the pixel points of the boundaries $e_1$ and $e_2$ of each first strip-like line segment $s_1$, the number $n_1$ and $n_2$ of the points on each boundary of which the gradient directions are orthogonal to the direction $\theta_i$ of the first strip-like line segment $s_i$ are calculated respectively, wherein the total number of points of each boundary is n. Here, once the angle between the direction of a boundary point and $\theta_i$ is less than threshold $T_\theta$, it is considered that the point belongs to the orthogonal range. The proportion of the points that belong to the orthogonal range is calculated according to the following equation:

$$n_\theta = \min\left[\frac{n_1}{n}, \frac{n_2}{n}\right] \qquad \text{Eq. 11}$$

Then, thresholds $T_{n1}$ and $T_{n2}$ are set, wherein $T_{n1} < T_{n2}$, and the third statistic of the data model is created:

$$\delta_{i,3} = \begin{cases} 2 & n_\theta < T_{n1} \\ 1 - 2\dfrac{n_\theta - T_{n1}}{T_{n2} - T_{n1}} & T_{n1} < n_\theta < T_{n2} \\ -1 & n_\theta > T_{n2} \end{cases} \qquad \text{Eq. 12}$$

In some embodiments, the statistics in the data model include the above three statistics, and alternatively or optionally, one or two of them. For example, when the above three statistics are included, the statistics in the data model may be $\delta_i = \delta_{i,1}\delta_{i,2}\delta_{i,3}$, with reference to the step S126 in FIG. 1C.

Figure 5:
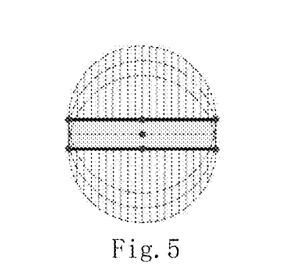
FIGS. 5-6 are characterization schematic diagrams of the neighboring relationship between any strip-like line segment and other strip-like line segments in the priori model in a further embodiment of the image detection method of the present disclosure.
Figure 6:
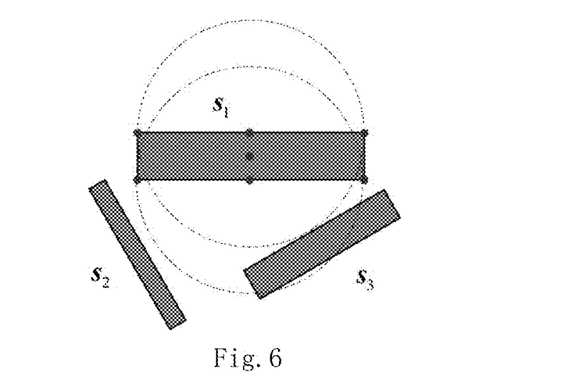

FIGS. 5-6 are characterization schematic diagrams of the neighboring relationship between any strip-like line segment and other strip-like line segments in the priori model in a further embodiment of the image detection method of the present disclosure.

In an embodiment of the present disclosure, for a direction between two strip-like line segments, the adjacent region $R_{in}$ of a strip-like line segment is first defined.

As shown in FIG. 5, the vertical dashed line part in the figure represents the adjacent region $R_{in}$ of a strip-like line segment at the center position. In an embodiment of the present disclosure, the adjacent region $R_{in}$ takes the two sides of the strip-like line segment as its diameters, the middle points on the sides are the centers, and two semicircular regions formed by drawing semicircles on the two sides of the strip-like line segment are just the adjacent region $R_{in}$ of the strip-like line segment. If any edge of another strip-like line segment partially or completely falls within this region, then there is adjacent relationship between these two strip-like line segments, which is denoted as $\sim_{in}$, otherwise, it is an external relationship, which is denoted as $\sim_{out}$.

Figure 1C:
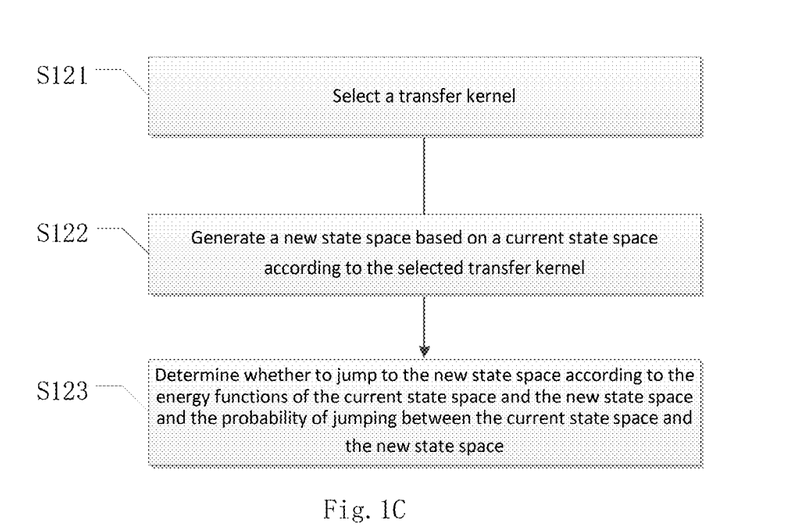
Figure 1D:
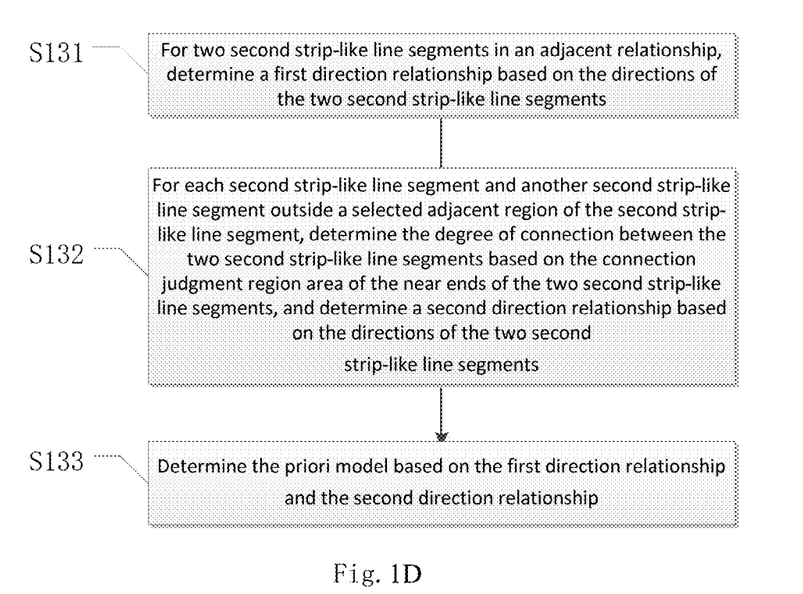

In an embodiment of the present disclosure, for any second strip-like line segment and a further second strip-like line segment within the adjacent region $R_{in}$ of the second strip-like line segment, that is, two second strip-like line segments in adjacent relationship, a first direction relationship is determined based on the directions of the two second strip-like line segments, i.e., the step S131 in FIG. 1D.

As shown in FIG. 6, the strip-like line segments $s_1$ and $s_2$ is in an external relationship, whereas the strip-like line segments $s_1$ and $s_3$ is in adjacent relationship. For the adjacent relationship $\sim_n$, the space distance between the two strip-like line segments is already very close, and thus, only the direction relationship may be considered in such a case. Therefore, in an embodiment of the present disclosure, the adjacent relationship between strip-like line segments is just the first direction relationship between the two.

The angle $\tau_{ij}$ between two strip-like line segments $s_i$ and $s_j$ may be calculated according to the following equation:

$$\tau_{ij} = \min[|\theta_i - \theta_j|, \pi - |\theta_i - \theta_j|] \qquad \text{Eq. 13}$$

In the equation, $\tau_{ij} \in [0, \pi/2]$, and $\theta_i$ and $\theta_j$ are the directions of $s_i$ and $s_j$ respectively.

If the angle between the directions of two strip-like line segments is too small, it indicates that their relationship is too sharp and needs to be penalized, for example, to reduce the weights of the statistics of the two strip-like line segments. A calculation formula for the adjacent relationship between two strip-like line segments is as follows:

$$g_{in}(s_i, s_j) = \theta_{in}(s_i, s_j) = \begin{cases} \infty & \tau_{ij} < \tau_{min} \\ 1 - \beta(\tau_{ij}, \tau_{min}, \pi/2) & \text{else} \end{cases} \qquad \text{Eq. 14}$$

In the equation, $\tau_{min}$ is a threshold for the angle judgment, the function $\beta(x, m, M)$ is a monotonically decreasing function, the definition domain is $[m, M]$, and the value domain is $[0, 1]$. A calculation formula for $\beta(x, m, M)$ is as follows:

$$\beta(x, m, M) = \frac{M - x}{M - m} \qquad \text{Eq. 15}$$

Figure 7:
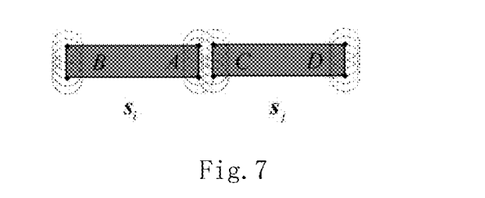
FIG. 7 is a characterization schematic diagram of the degree of connection between strip-like line segments in the priori model in an embodiment of the image detection method of the present disclosure.

FIG. 7 is a characterization schematic diagram of the degree of connection between strip-like line segments in the priori model in an embodiment of the image detection method of the present disclosure.

In some embodiments, for the external relationship $\sim_{out}$ between two strip-like line segments as shown in FIG. 6, it is further necessary to consider the degree of connection between the two strip-like line segments. In particular, for each second strip-like line segment and another second strip-like line segment outside a selected adjacent region of the second strip-like line segment, the degree of connection between the two second strip-like line segments is determined based on the connection judgment region area of the near ends of the two second strip-like line segments, and a second direction relationship is determined based on the directions of the two second strip-like line segments, referring to the step S132 in FIG. 1D.

The formula which directly calculates the distances between the end points of two line segments in a conventional point process method is already not applicable to this disclosure, and therefore, an embodiment of the present disclosure employs the following formula to calculate the degree of connection between the two strip-like line segments $s_i$ and $s_j$:

$$I(s_i^A, s_j^C) = \frac{\text{Area}(s_i^A) I \text{ Area}(s_j^C)}{\min[\text{Area}(s_i^A), \text{Area}(s_j^C)]} \qquad \text{Eq. 16}$$

In the equation, Area(g) represents the connection judgment region area, and here, represents the area of the connection ends $s_i^A$ and $s_j^C$ of $s_i$ and $s_j$. As shown in FIG. 7, the connection judgment region area of the connection end $s_i^A$ is the area formed by drawing a series of circles with all the points on the end of the line segment as the centers and the distance between $s_i^A$ and $s_j^C$ as the radius. Likewise, the connection judgment region area of the connection end $s_j^C$ is the area formed by drawing a series of circles with all the points on the end of the line segment as the centers and the distance between $s_i^A$ and $s_j^C$ as the radius. The intersection of these two areas is divided by the smaller of the two, and the degree of connection between the two strip-like line segments $s_i$ and $s_j$ is obtained. Therein, A and C represent the near ends of the two strip-like line segments $s_i$ and $s_j$ and B and D are the far ends.

If the angle between the directions of two strip-like line segments is too large, it indicates the curvature of the constituted structure is too large, and a penalty is needed, for example, to reduce the weights of the statistics of the two strip-like line segments. A calculation formula for the external relationship between two strip-like line segments is as follows:

$$g_{out}(s_i,s_j)=I(s_i,s_j)+\theta_{out}(s_i,s_j) \qquad \text{Eq. 17}$$

In the equation, $I(s_i, s_j)$ represents the degree of connection between the two strip-like line segments, $\theta_{out}(s_i, s_j)$ represents the second direction relationship between the two strip-like line segments, and similar to the first direction relationship, $\theta_{out}(s_i, s_j)$ is represented as:

$$\theta_{out}(s_i, s_j) = \begin{cases} -\beta(\tau_{ij}, 0, \tau_{max}) & \tau_{ij} < \tau_{max} \\ 2 & \text{else} \end{cases} \qquad \text{Eq. 18}$$

Therein, $\tau_{max}$ is a threshold for judging the angle between the strip-like line segments.

At the step S133 as shown in FIG. 1D, the priori model is determined based on the first direction relationship and the second direction relationship. In some embodiments, a formula for the priori model may be synthetically represented as:

$$U_p(S) \propto \exp -\left(\omega_0 N + \omega_1 N_f + \omega_2 N_s + \omega_3 \sum_{\langle s_i,s_j\rangle \sim in} g_{in}(s_i, s_j) + \omega_4 \sum_{\langle s_i,s_j\rangle \sim out} g_{out}(s_i, s_j)\right) \qquad \text{Eq. 19}$$

Therein, $\omega_i$ (i=0, 1, . . . , 4) is a weight, N represents the total number of the strip-like line segments, $N_f$ represents the number of connectionless strip-like line segments, $N_s$ represents the number of single-connection strip-like line segments, $\langle s_i,s_j\rangle \sim_{in}$ indicates that $s_i$ and $s_j$ belongs to adjacent relationship, and $\langle s_i,s_j\rangle \sim_{out}$ indicates that $s_i$ and $s_j$ belongs to an external relationship.

The second term and the third term in parentheses in Eq. 19 may also be omitted.

FIGS. 8A-8D are schematic diagrams of various transfer kernels used in some embodiments of the image detection method of the present disclosure.

In an embodiment of the present disclosure, the RJM-CMC method is employed to perform sampling, including selecting a transfer kernel, generating a new state space based on a current state space, and determining whether to jump to the new state space according to the energy functions of the current state space and the new state space and the probability of jumping between the current state space and the new state space.

In particular, suppose that $Q(\omega \to \bullet)$ is the transfer kernel, the current state space is $\omega$, and the new state space to be generated is $\omega'$, and then a flow of the sampling algorithm is as follows (referring to FIG. 1C):

step S121, selecting a transfer kernel $Q(\omega \to \bullet)$.

step S122, generating a new state space $\omega'$ according to the selected transfer kernel $Q(\omega \to \bullet)$, and step S123, calculating the Green ratio, which is denoted as R, and transferring from the current state $\omega$ to the new state $\omega'$ according to the transfer kernel $Q(\omega \to \omega')$, wherein a calculation formula for the expression of a condition that the acceptance probability needs to satisfy a detailed balance condition to ensure that the algorithm converges to the density function of the point process is as follows:

$$R = \frac{h(\omega')Q(\omega \to \omega')}{h(\omega)Q(\omega' \to \omega)} \qquad \text{Eq. 20}$$

In the equation, $h(\bullet)$ represents the energy function of a state space, and $Q(\omega \to \omega')$ and $Q(\omega' \to \omega)$ represent the transfer probabilities of jumping from the state space $\omega$ to the state space $\omega'$ and jumping from the state space $\omega'$ to the state space $\omega$, respectively.

Jump is accepted according to the probability min[1, R] to jump to the new state space.

In an embodiment of the present disclosure, the transfer kernel for jumping between different state spaces may be constituted by different transfer kernels, that is:

$$Q(\omega \to \bullet)=\Sigma p_i q_i(\omega \to \bullet) \qquad \text{Eq. 21}$$

In the equation, $q_i(\omega \to \bullet)$ is a sub-kernel constituting the transfer kernel $Q(\omega \to \bullet)$, and $p_i$ represents the probability of selecting the sub-kernel for jumping, wherein $\Sigma p_i=1$.

Figure 8A:
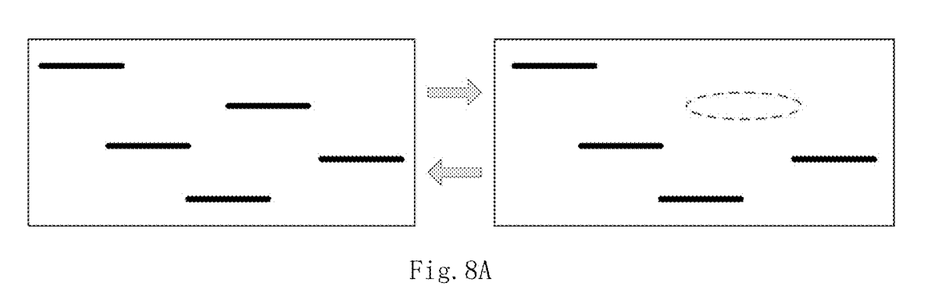
FIGS. 8A-8D are schematic diagrams of various transfer kernels used in an embodiment of the image detection method of the present disclosure.
Figure 8B:
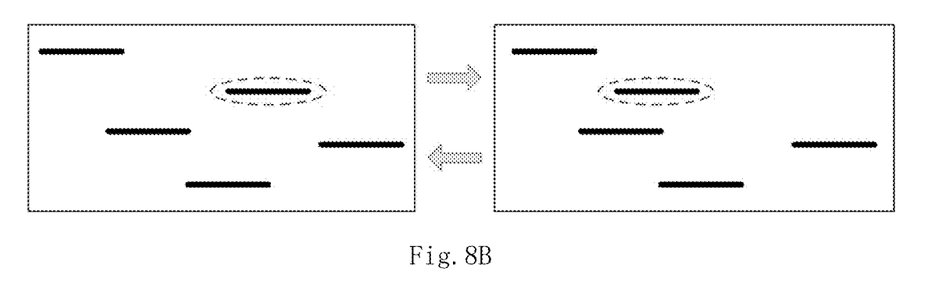
Figure 8C:
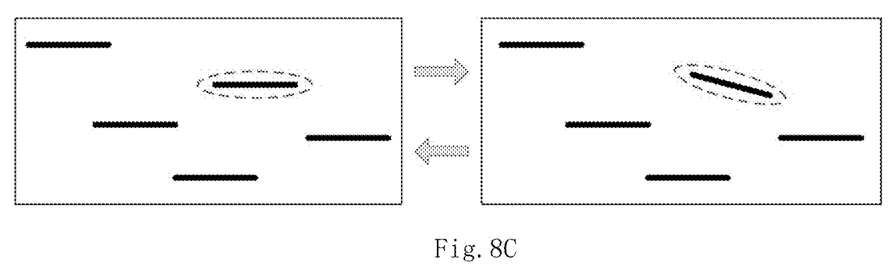
Figure 8D:
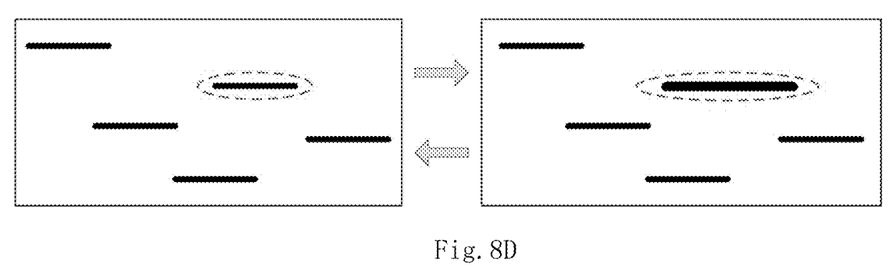

For example, the sampling algorithm in an embodiment of the present disclosure uses the uniform birth and death kernel as shown in FIG. 8A and/or the simple moving kernels as shown in FIGS. 8B-8D as sub-kernels for jumping.

Figure 9:
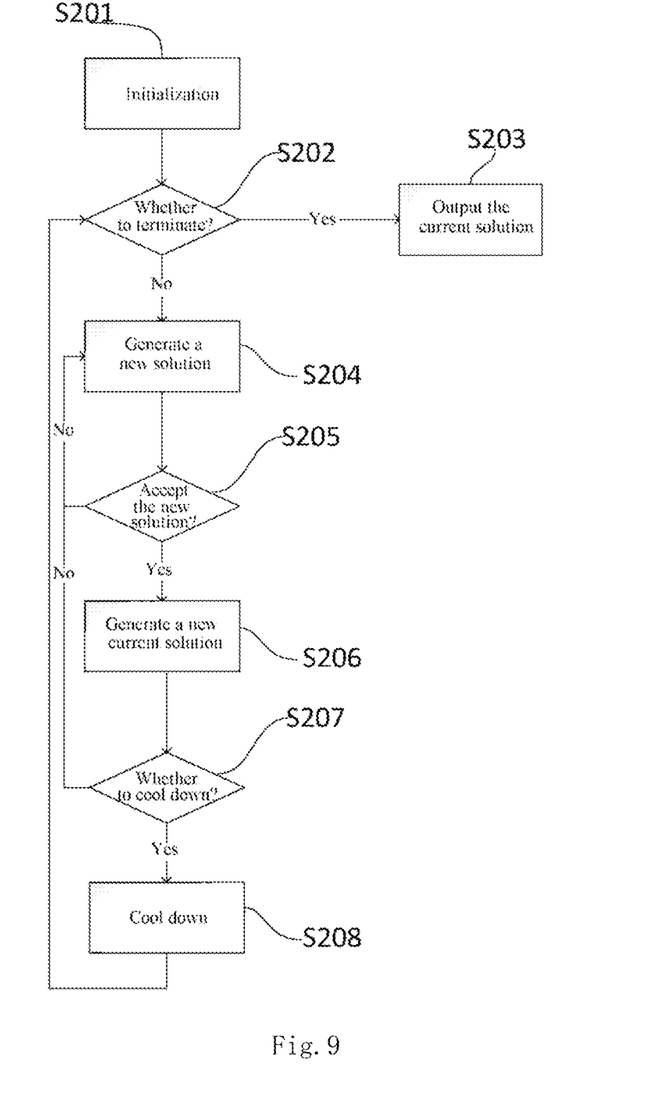
FIG. 9 is a schematic flow chart of the solution optimization process in an embodiment of the image detection method of the present disclosure.

FIG. 9 is a schematic flow chart of the solution optimization process in some embodiments of the image detection method of the present disclosure.

Figure 10:
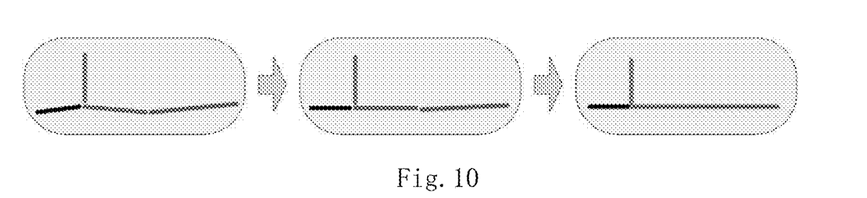
FIG. 10 is a schematic flow chart of the simulated annealing process in an embodiment of the image detection method of the present disclosure.

FIG. 10 is a schematic diagram of the simulated annealing process in some embodiments of the image detection method of the present disclosure.

As shown in FIG. 9, the solution optimization process of an embodiment of the present disclosure includes:

the simulated annealing algorithm, of which the main flow is:

S201, initialization and setting parameters,

S202, judging whether to terminate generating a new solution (i.e., judging whether the termination condition is satisfied), and if yes, proceeding to S203, otherwise, proceeding to S204, S203, outputting the current solution as a globally optimal solution, S204, generating a new solution x', S205, judging whether the new solution is accepted, and if yes, proceeding to S206, otherwise, returning to S204 to regenerate a new solution, wherein the increment $\Delta x=C(x')-C(x)$ is calculated for judging whether the new solution is accepted, and C(x) is an evaluation function, and wherein to obtain the globally optimal solution with a certain probability, the simulated annealing algorithm accepts a new solution worse than the current solution with a certain probability, that is, when the $\Delta x<0$, it is indicated that the new solution is better than the current solution, and at this point, the new solution is always accepted, otherwise, it is indicated that the new solution is worse than the current solution, and at this point, the new solution is accepted with a certain probability, S206, generating a new current solution, S207, judging whether to cool down, and if yes, proceeding to S208, otherwise, returning to S204 to regenerate a new solution, and S208, cooling down and returning to S202.

As shown in FIG. 10, the optimal solution of the target structure may be gradually approached by the simulated annealing algorithm, and the optimal solution is finally obtained.

The embodiments of the present disclosure may take the form of all hardware embodiments, all software embodiments or embodiments including hardware and software units.

In some embodiments, the present disclosure is implemented by software, which includes, but is not limited to, firmware, resident software, microcode, etc. In addition, as shown in FIG. 11, the present disclosure may take the form of a computer program product 1111 which may be accessed from a computer usable or computer readable medium 1102 which provides program code, and the program code is used for being used by or being combined with a computer or any instruction execution system.

Figure 11:
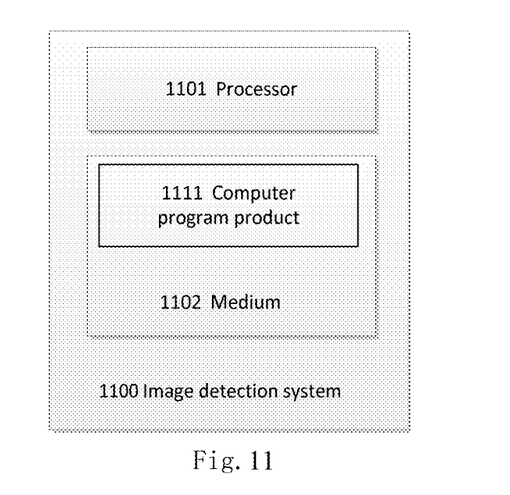
FIG. 11 is a block diagram of an embodiment of an image detection system of the present disclosure.

In some embodiments, as shown in FIG. 11, an image detection system 1100 of an embodiment of the present disclosure includes one or more processor 1101 configured to execute computer instructions to perform the following actions: establishing a data model based on mark point information of a group of first strip-like line segments, the mark point information of each first strip-like line segment including the length, the width, the direction and the coordinate of the center point of the first strip-like line segment, establishing a priori model based on the distribution and the number of a group of second strip-like line segments which constitute a target structure, establishing a probability density function for the data model and the priori model, and performing sampling and solution optimization to obtain a globally optimal solution, and detecting the image taking the globally optimal solution as a target model.

The image detection system 1100 may be coupled to (not shown) or contain the computer usable or computer readable medium 1102 which provides program code.

In some embodiments of the image detection system of the present disclosure, the processor 1100 is configured to, when the data model is established, execute computer instructions to: divide each first strip-like line segment into multiple sub-strip-like line segments, and calculate the homogeneity within the first strip-like line segment according to the position relationship between every two sub-strip-like line segments, calculate the heterogeneity between each first strip-like line segment and each of its neighboring first strip-like line segments according to the position relationship between the first strip-like line segment and each of its neighboring first strip-like line segments, and determine a first statistic of each first strip-like line segment based on the homogeneity and the heterogeneity.

In some embodiments of the image detection system of the present disclosure, the processor 1100 is configured to, when the data model is established, execute computer instructions to: determine a second statistic of each first strip-like line segment based on the gradient magnitudes of the boundary of each first strip-like line segment, and determine a third statistic of each first strip-like line segment based on the gradient directions of the boundary of each first strip-like line segment.

In some embodiments of the image detection system of the present disclosure, the processor 1100 is configured to, when the priori model is established, execute computer instructions to: for any second strip-like line segment and another second strip-like line segment within a selected adjacent region of the second strip-like line segment, determine a first direction relationship based on the directions of the two second strip-like line segments.

In some embodiments of the image detection system of the present disclosure, the processor 1100 is configured to, when the priori model is established, execute computer instructions to: for each second strip-like line segment and another second strip-like line segment outside a selected adjacent region of the second strip-like line segment, determine the degree of connection between the two second strip-like line segments based on the connection judgment region area of the near ends of the two second strip-like line segments, and determine a second direction relationship based on the directions of the two second strip-like line segments.

For specific processes of various operations implemented by the image detection system of the embodiments of the present disclosure, reference may be made to the above embodiments described with reference to FIG. 1 to FIG. 10.

For the sake of illustration, the computer usable or computer readable medium may be any apparatus which may contain, store, communicate, transmit or convey a program for being used by or being combined with an instruction execution system, apparatus or device (e.g., a processor). The medium may be an electronic, magnetic, optical, electromagnetic, infrared or semiconductor system (or apparatus or device) or communications medium, that is, may be a non-volatile or volatile medium. Examples of the computer readable medium include a semiconductor or solid memory, tape, removable computer floppy disk, random access memory (RAM), read only memory (ROM), hard disk and optical disk. Examples of current optical disk include the compact disc-read only memory (CD-ROM), the compact disc-read/write (CD-R/W) and the DVD.

The processor adapted for executing program code includes at least one processor 1101 directly or indirectly coupled with the computer usable or computer readable medium 1102 via the system bus, which processor 1101 may be implemented by a circuit with a logic operation function, for example, may be a central processing unit CPU, a field programmable logic array FPGA, application specific integrated circuit ASIC, a microcontroller unit MCU or a digital signal processor DSP. The computer usable or computer readable medium 1102 may include a local memory deployed during actual execution of the program code, a mass storage device and a cache memory, which cache memory provides a temporary storage device for at least a certain kind of program code to reduce the number of times the code must be retrieved from the mass storage device during execution. An input/output or I/O device (including, but not limited to, a keyboard, a display, a pointing device, etc.) may be coupled to the system directly or via an intermediate I/O controller. A network adapter may also be coupled to the system, such that a data processing system can become coupled to other data processing system or remote printer or storage device via an intermediate private or public network. The modem, the cable modem and the Ethernet card are just a part of currently available types of network adapters.

Although the embodiments of the present disclosure have already been illustrated and described, it may be appreciated by the person having ordinary skills in the art that many changes, modifications, replacements and variations may be made to these embodiments without departing from the principles and purposes of the present disclosure, and the scope of the invention is defined by the claims and their equivalents.

What is claimed is:

1. An image detection method including:
   establishing a data model based on mark point information of a group of first strip-like line segments, the mark point information of each first strip-like line segment including the length, the width, the direction and the coordinate of the center point of the first strip-like line segment, wherein the establishing a data model includes:
      dividing each first strip-like segment into multiple sub-strip-like line segments, and calculating the homogeneity within the first strip-like line segment according to the position relationship between every two sub-strip-like line segments,
      calculating the heterogeneity between each first strip-like line segment and each of its neighboring first strip-like line segments according to the position relationship between the first strip-like line segment and each of its neighboring first strip-like line segments, and
      determining a first statistic of each first strip-like line segment based on the homogeneity and the heterogeneity,
   establishing a priori model based on the distribution and the number of a group of second strip-like line segments which constitute a target structure,
   establishing a probability density function for the data model and the priori model, and performing sampling and solution optimization to obtain a globally optimal solution, and
   detecting the image taking the globally optimal solution as a target model.

2. The method as claimed in claim 1, wherein the establishing a data model includes:
   determining a second statistic of each first strip-like line segment based on the gradient magnitudes of the boundary of each first strip-like line segment, and
   determining a third statistic of each first strip-like line segment based on the gradient directions of the boundary of each first strip-like line segment.

3. The method as claimed in claim 1, wherein the establishing a data model includes:
   determining a second statistic of each first strip-like line segment based on the gradient magnitudes of the boundary of each first strip-like line segment, and
   determining a third statistic of each first strip-like line segment based on the gradient directions of the boundary of each first strip-like line segment.

4. The method as claimed in claim 3, wherein in the data model the statistic of each first strip-like line segment is the product of the corresponding first statistic, second statistic and third statistic.

5. The method as claimed in claim 1, wherein the establishing a priori model includes:
   for any second strip-like line segment and another second strip-like line segment within a selected adjacent region of the second strip-like line segment, determining a first direction relationship based on the directions of the two second strip-like line segments.

6. The method as claimed in claim 1, wherein the establishing a priori model includes:
   for each second strip-like line segment and another second strip-like line segment outside a selected adjacent region of the second strip-like line segment, determining the degree of connection between the two second strip-like line segments based on the connection judgment region area of the near ends of the two second strip-like line segments, and determining a second direction relationship based on the directions of the two second strip-like line segments.

7. The method as claimed in claim 1, wherein the performing sampling includes:
   selecting a transfer kernel,
   generating a new state space based on a current state space according to the selected transfer kernel, and
   determining whether to jump to the new state space according to the energy functions of the current state space and the new state space and the probability of jumping between the current state space and the new state space.

8. The method as claimed in claim 7, wherein the transfer kernel includes multiple different sub-kernels, which sub-kernels include at least one of uniform birth and death kernels and simple moving kernels.

9. An image detection system including one or more processor configured to execute computer instructions to perform one or more step of the following method:
   establishing a data model based on mark point information of a group of first strip-like line segments, the mark point information of each first strip-like line segment including the length, the width, the direction and the coordinate of the center point of the first strip-like line segment, wherein the establishing a data model includes:
      dividing each first strip-like line segment into multiple sub-strip-like line segments, and calculating the homogeneity within the first strip-like line segment according to the position relationship between every two sub-strip-like line segments,
      calculating the heterogeneity between each first strip-like line segment and each of its neighboring first strip-like line segments according to the position relationship between the first strip-like line segment and each of its neighboring first strip-like line segments, and
      determining a first statistic of each first strip-like line segment based on the homogeneity and the heterogeneity,
   establishing a priori model based on the distribution and the number of a group of second strip-like line segments which constitute a target structure,
   establishing a probability density function for the data model and the priori model, and performing sampling and solution optimization to obtain a globally optimal solution, and
   detecting the image taking the globally optimal solution as a target model.

10. The system as claimed in claim 9, wherein the establishing a data model includes:
    determining a second statistic of each first strip-like line segment based on the gradient magnitudes of the boundary of each first strip-like line segment, and
    determining a third statistic of each first strip-like line segment based on the gradient directions of the boundary of each first strip-like line segment.

11. The system as claimed in claim 9, wherein the establishing a data model includes:

determining a second statistic of each first strip-like line segment based on the gradient magnitudes of the boundary of each first strip-like line segment, and determining a third statistic of each first strip-like line segment based on the gradient directions of the boundary of each first strip-like line segment.

12. The system as claimed in claim 11, wherein in the data model the statistic of each first strip-like line segment is the product of the corresponding first statistic, second statistic and third statistic.

13. The system as claimed in claim 9, wherein the establishing a priori model includes:

for any second strip-like line segment and another second strip-like line segment within a selected adjacent region of the second strip-like line segment, determining a first direction relationship based on the directions of the two second strip-like line segments.

14. The system as claimed in claim 9, wherein the establishing a priori model includes:

for each second strip-like line segment and another second strip-like line segment outside a selected adjacent region of the second strip-like line segment, determining the degree of connection between the two second strip-like line segments based on the connection judgment region area of the near ends of the two second strip-like line segments, and determining a second direction relationship based on the directions of the two second strip-like line segments.

15. A non-volatile computer readable medium configured to store a computer program product containing instructions which, when executed in a processor, implement one or more step of the following method:

causing to establish a data model based on mark point information of a group of first strip-like line segments, the mark point information of each first strip-like line segment including the length, the width, the direction and the coordinate of the center point of the first strip-like line segment, wherein to establish the data model includes:

dividing each first strip-like line segment into multiple sub-strip-like line segments and calculating the homogeneity within the first strip-like line segment according to the position relationship between every two sub-strip-like line segments, calculating the heterogeneity between each first strip-like line segment each of its neighboring first strip-like line segments according to the position relationship between the first strip-like line segment and each of its neighboring first strip-like line segments, and determining a first statistic of each first strip-like line segment based on the homogeneity and the heterogeneity, causing to establish a priori model based on the distribution and the number of a group of second strip-like line segments which constitute a target structure, causing to establish a probability density function for the data model and the priori model, and perform sampling and solution optimization to obtain a globally optimal solution, and causing to detect the image taking the globally optimal solution as a target model.

16. The non-volatile computer readable medium as claimed in claim 15, wherein the establishing a data model includes:

determining a second statistic of each first strip-like line segment based on the gradient magnitudes of the boundary of each first strip-like line segment, and determining a third statistic of each first strip-like line segment based on the gradient directions of the boundary of each first strip-like line segment.

17. The non-volatile computer readable medium as claimed in claim 15, wherein the establishing a data model includes:

determining a second statistic of each first strip-like line segment based on the gradient magnitudes of the boundary of each first strip-like line segment, and determining a third statistic of each first strip-like line segment based on the gradient directions of the boundary of each first strip-like line segment.

* * * * *